No. 715,783. Patented Dec. 16, 1902.
L. F. GRAHAM.
FRUIT PEELING MACHINE.
(Application filed Apr. 14, 1902.)

(No Model.) 6 Sheets—Sheet 1.

Fig. 1.

Witnesses. Inventor.
Lozelle Forbes Graham
by his Attorney.

No. 715,783. Patented Dec. 16, 1902.
L. F. GRAHAM.
FRUIT PEELING MACHINE.
(Application filed Apr. 14, 1902.)

(No Model.) 6 Sheets—Sheet 2.

Fig. 2.

No. 715,783. Patented Dec. 16, 1902.
L. F. GRAHAM.
FRUIT PEELING MACHINE.
(Application filed Apr. 14, 1902.)
(No Model.) 6 Sheets—Sheet 3.

Witnesses.
Inventor.
Lozelle Forbes Graham
by Wm. F. Booth
his Attorney.

No. 715,783. Patented Dec. 16, 1902.
L. F. GRAHAM.
FRUIT PEELING MACHINE.
(Application filed Apr. 14, 1902.)

(No Model.) 6 Sheets—Sheet 4.

Witnesses

Inventor.
Lozelle Forbes Graham
by Wm. F. Booth
his Attorney.

No. 715,783. Patented Dec. 16, 1902.
L. F. GRAHAM.
FRUIT PEELING MACHINE.
(Application filed Apr. 14, 1902.)

(No Model.) 6 Sheets—Sheet 6.

Witnesses. Inventor.
Lozelle Forbes Graham
by Wm. F. Booth
his Attorney.

THE NORRIS PETERS CO., PHOTO-LITHO., WASHINGTON, D. C.

UNITED STATES PATENT OFFICE.

LOZELLE F. GRAHAM, OF SAN JOSE, CALIFORNIA.

FRUIT-PEELING MACHINE.

SPECIFICATION forming part of Letters Patent No. 715,783, dated December 16, 1902.

Application filed April 14, 1902. Serial No. 103,072. (No model.)

*To all whom it may concern:*

Be it known that I, LOZELLE FORBES GRAHAM, a citizen of the United States, residing at San Jose, Santa Clara county, State of California, have invented certain new and useful Improvements in Fruit-Peeling Machines; and I do hereby declare the following to be a full, clear, and exact description of the invention.

My invention relates to the class of machines for peeling fruit.

The object of my invention is to provide an effective machine especially adapted for the peeling of peaches and apricots, though applicable to the peeling of other fruit.

My invention consists in the novel constructions, arrangements, and combinations of parts, which I shall hereinafter fully describe and claim.

Referring to the accompanying drawings.

A is the base-plate.

B is a column rising from the base-plate and in which is fitted the spindle C, held by a set-screw $c$.

D is the feed-table. Its hub $d$ is rotatably fitted upon spindle C and rests on top of column B, Fig. 2. The feed-table carries, as seen in Fig. 3, a series of fruit-holders, (represented by E.) Each of these holders consists, as shown particularly in Figs. 9 and 10, of a head disk or plate $e$, having or secured to it a stem $e'$, Fig. 9, rotatably mounted in a boss $d'$ of the feed-table, said stem extending below the table to receive the devices by which the holder is rotated and by which it is adjusted, as will be explained in due course. Each fruit-holder disk or plate $e$ is provided with suitable means, such as the impaling-pins $e^2$, to hold the fruit thereon.

Figure 2:
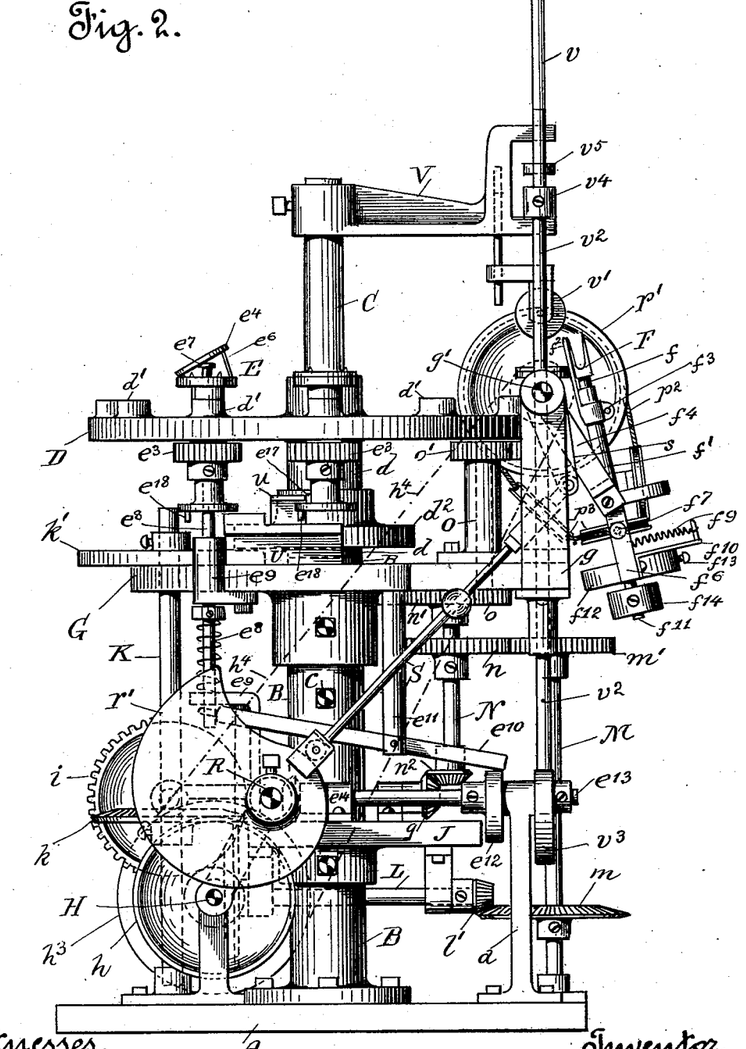
Fig. 2 is a side elevation of the machine looking from the right of Fig. 1.
Figure 3:
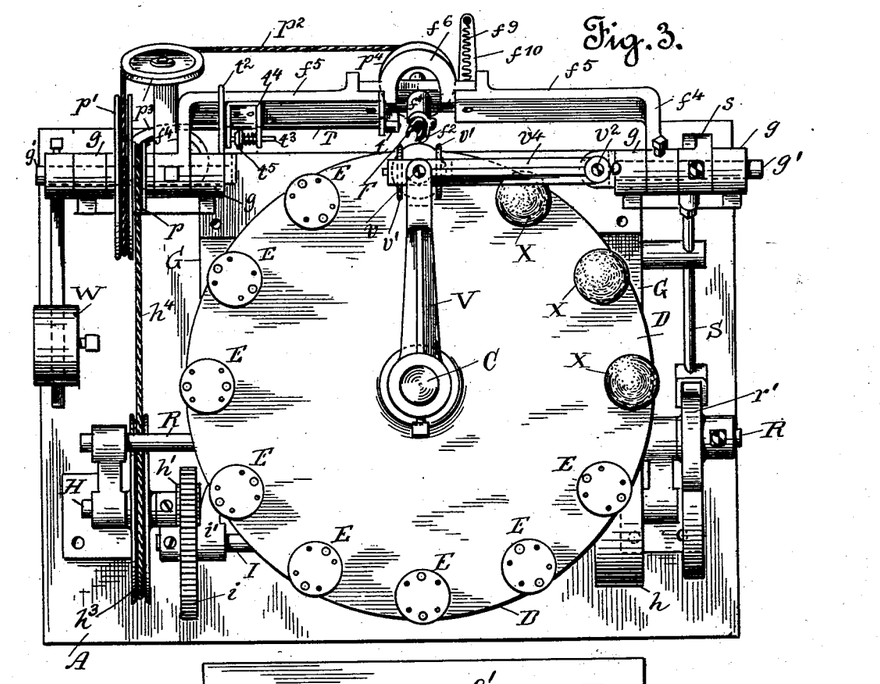
Fig. 3 is a top plan of the machine viewed in the same relative position as that of Fig. 1 and showing the series of fruit-holders, some of which are shown with fruit X upon them.
Figures 6, 7:
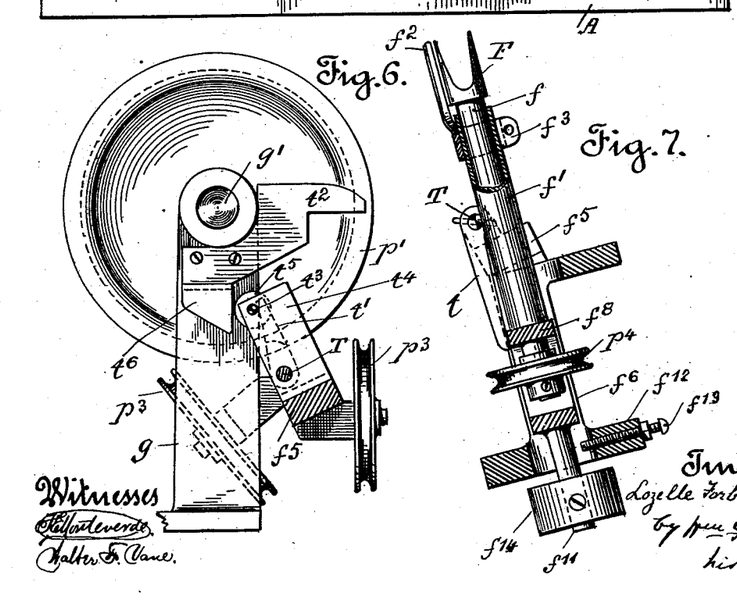
Fig. 6 is an enlarged detail showing a portion of the means for throwing the knife up from contact with the fruit after the completion of the peeling operation.
Fig. 7 is an enlarged sectional elevation of the peeling-knife and its connected parts.
Figure 8:
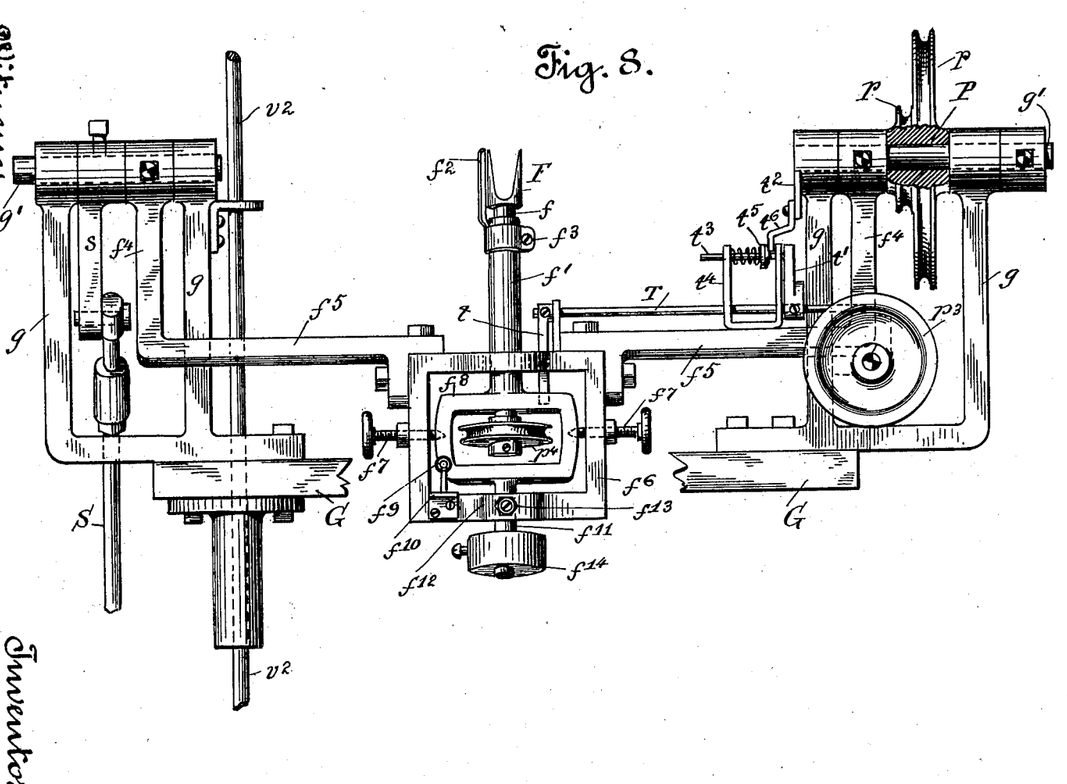
Fig. 8 is an enlarged detail elevation of the swinging bracket $f^5$ and the peeling-knife which it carries.
Figures 11, 12, 13, 14:
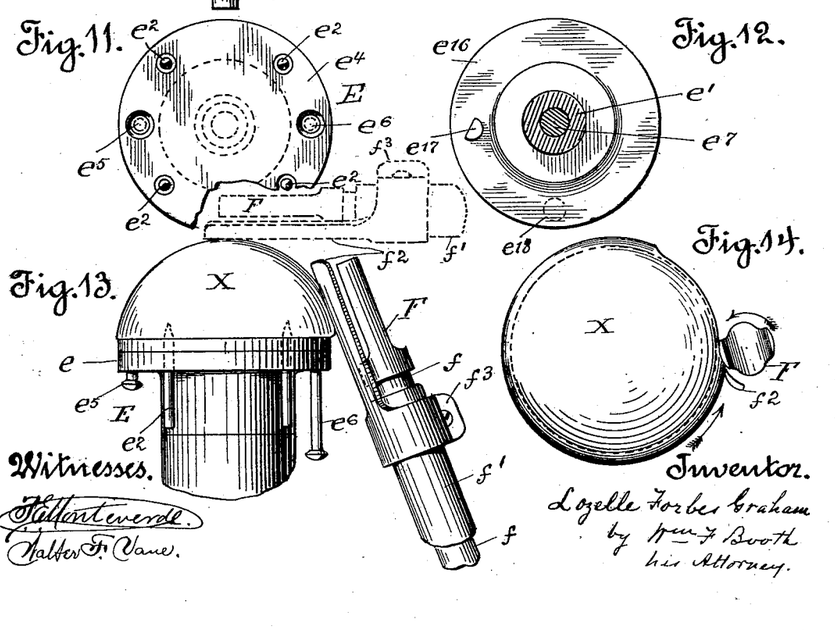
Fig. 11 is a top plan of fruit-holder E.
Fig. 12 is a sectional plan of the base-disk $e^{16}$ of Fig. 10.
Fig. 13 is a detail view showing the relation of the knife F to the half-fruit X on holder E, the dotted lines showing how the knife moves in a vertical arc upon the hemisphere of the fruit.
Fig. 14 is a top view of same, indicating by the arrows the direction of rotation of the fruit and the knife and showing the relation of the cutting-plane of the knife and the gage thereof to the surface of the fruit.

F is the peeling-knife, Figs. 2 and 3. It consists, as shown in Figs. 7 and 8, of one or more blades, here shown as two in number oppositely located. These are joined at their bases and have a stem $f$, which is fitted rotatably in a carrying-sleeve $f'$. A gage $f^2$ is secured to this sleeve and rises beside the knife-blades and just outside the circle or path of their movement, as seen in Fig. 14. This gage is in its best form an adjustable one, and for this purpose its base is provided with a clamp $f^3$, which embraces the sleeve $f'$, and by being set in different positions circumferentially on the sleeve will carry the gage into different positions circumferentially relatively to the path of the blades, as I shall presently explain.

Secured upon column B is a fixed platform G, which lies below the feed-table D. Secured to this platform are standards $g$, Figs. 1 and 8, in which are journaled shafts $g'$, upon which are secured bracket-arms $f^4$ of a swinging bracket $f^5$, Figs. 3 and 8. To a central frame $f^6$, Fig. 8, of this bracket is pivoted by the side journal-pins $f^7$ the open base $f^8$ of the knife-carrying sleeve $f'$. A spring $f^9$, Figs. 2 and 8, secured to this base $f^8$ and to an arm $f^{10}$ of the frame $f^6$, controls the pivotal movement of the sleeve $f'$, the limits of said movement being defined by the lower extremity $f'$ of the sleeve playing in a socket-ring $f^{12}$, forming the base of frame $f^6$. A screw $f^{13}$ in this ring forms an adjustable stop for defining these limits. The lower extremity $f^{11}$ of the carrying-sleeve $f'$ may be weighted, as shown at $f^{14}$, to counterbalance it.

At this point it will be best for the sake of clearness to set out the general operation of the parts thus far described.

Figure 1:
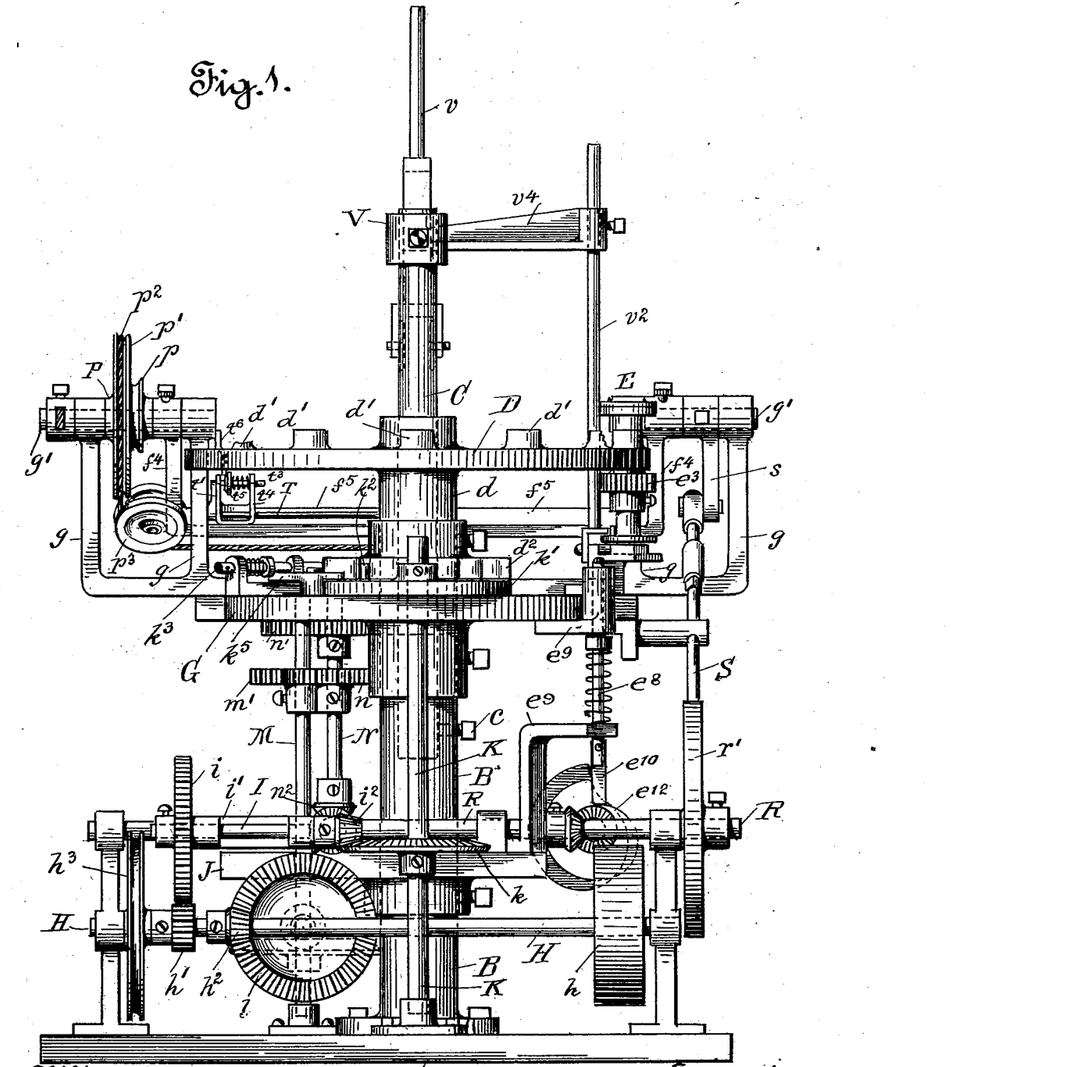
Figure 1 is a front elevation of the machine, only one of the fruit-holders E being shown, the position of the remainder being indicated by the bosses $d'$ of table D.

The fruit—peach, apricot, or other fruit—is first halved. One half (represented by X) is then placed, as shown in Figs. 13 and 14, upon a holder E, with its diametrical plane down and its hemisphere up. It is held by the impaling-points $e^2$. It must now be supposed that a rotary step-by-step or periodical movement is imparted to the feed-table D, whereby the fruit is successively carried around to the knife F. The swinging bracket $f^5$ is in its first or initial position, hanging down against the standards $g$, as seen in Figs. 1, 2, and 3, and in this position of the bracket the knife F is in an approximately vertical position, and under the influence of the spring $f^9$ is held with yielding pressure in toward the path of the fruit. We now have the knife resting, through its gage $f^2$, Figs. 13 and 14, with a yielding pressure against the fruit, which has come to a temporary rest as far as the step-by-step feed of the table D is concerned. This contact of the knife is initially at the base of the fruit or circumference of largest diameter, as in Fig. 13. The effect of the gage $f^2$ and its adjustment will now be understood. If this gage were so set circumferentially on the knife-sleeve $f'$ as to lie in alined radial planes of both the fruit and the sleeve, it is obvious that being outside of the path to be described by the knife-blades it would lie between the fruit and blades and wholly prevent the blades from touching the fruit at all; but if the gage be turned circumferentially on the sleeve to one side of this plane—that is, away from and back of the cutting-plane of the blades—it will permit the blades to press in toward and come in contact with the fruit, as in Fig. 14, and by moving it around a little farther back it will permit the knife-blades to cut into the fruit to a depth equal to the distance of its adjustment back from said cutting-plane. Thus the thickness of the peeling is defined and regulated. Now it must be supposed that when the fruit has reached the knife said fruit will be given a rotary movement in the direction of the arrow in Fig. 14 by rotation imparted to its holder E, and it must also be supposed that an axially rotary movement in the direction of the arrow, Fig. 14, will be imparted to the knife F, which direction is opposite to that imparted to the fruit. Such being the case, the knife will cut a peeling from the fruit around its circumference of largest diameter, as indicated in Fig. 14; but a further motion must also be supposed—to wit, one which will gradually carry the knife bodily through an arc of a circle in a vertical plane, as is indicated by the dotted lines in Fig. 13, and in contact with the spherical or convex surface of the fruit, the knife passing from an approximately vertical position to an approximately horizontal one, as is clearly indicated in Fig. 13, thereby passing from the extremity of the horizontal diameter of the fruit to the extremity of its vertical diameter, and thus coming in cutting contact with the entire surface of the hemisphere of the rotating fruit. This movement of the knife is effected by the gradual upward swing of the bracket $f^5$, which carries it. When the entire surface of the fruit has been peeled and the knife is returning to its initial position, the table D makes another movement, carrying the peeled fruit away from the knife and feeding up a second fruit to it, and the operation is repeated. The further details of the machine will now be clear.

Figure 4:
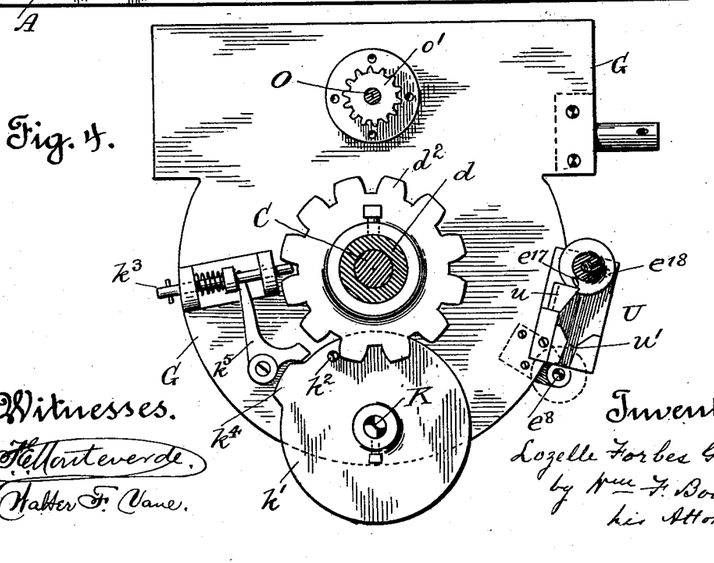
Fig. 4 is a top sectional plan of platform G, showing particularly the step-by-step feed mechanism for the table D of Fig. 3.
Figure 5:
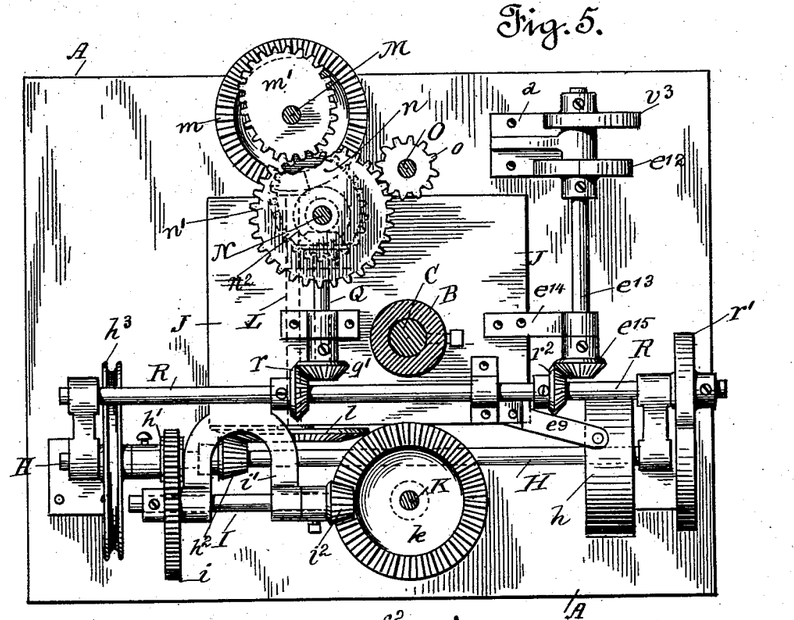
Fig. 5 is a horizontal sectional top plan taken immediately below platform G.

The step-by-step or periodic feed or revolution of table D is effected by the following means:

H, Figs. 1 and 5, is the main shaft, to which suitable power is to be applied. I have here shown a pulley $h$, to which a belt may extend. Upon shaft H is a pinion $h'$, which meshes with a gear $i$ on a counter-shaft I, journaled in a bracket $i'$, carried by a platform J, secured to column B, Fig. 5. The counter-shaft I carries also a pinion $i^2$, which meshes with a gear $k$ on a vertical counter-shaft K, journaled below in the base-plate A and above in the platform G, Fig. 2. Upon the upper end of this shaft K is a driving-disk $k'$, having a pin or stud $k^2$, (seen best in Fig. 4,) which is adapted at each revolution of the disk to engage with the teeth of a gear $d^2$ on the hub $d$ of the feed-table D, whereby the gear $d^2$ is turned one tooth at each revolution of the disk $k'$, and thus the feed-table D is periodically turned, its movement being timed and proportioned to carry at each step one of its fruit-holders E to the knife. Now in order to lock the table positively at the end of each of its steps there is a spring-actuated retaining-pawl $k^3$, Fig. 4, mounted upon platform G and which is adapted to enter its point between the teeth of the hub-gear $d^2$. Further, in order to release this pawl to enable the table D to make its movement there is a cam portion $k^4$ on the periphery of the driving-disk $k'$, which by its timely contact with a bell-crank tripping-lever $k^5$, pivoted on platform G, will cause said lever by contact with the pawl $k^3$ to force said pawl back to relieve the hub-gear $d^2$ and the table D.

The rotation of the fruit-holder E is effected by the following mechanism: Upon the power-shaft H is a pinion $h^2$, Fig. 1, which meshes with a gear $l$ on a counter-shaft L, (seen in Fig. 2,) mounted under the platform J. This shaft has on its other end a pinion $l'$, Fig. 2, which meshes with a gear $m$ on a vertical counter-shaft M, mounted below in the base-plate A and above in the platform G. Upon the upper end of vertical shaft M is a gear $m'$, Figs. 1, 2, and 5, which meshes with a gear $n$ on a vertical counter-shaft N, mounted below in the platform J and above in the platform G. Upon the upper end of shaft N is a gear $n'$, which meshes with a pinion $o$, Figs. 2 and 5, on a short vertical shaft O, journaled in platform G and rising above said platform nearly to the plane of table D. Upon the upper end of shaft O is a gear $o'$, Figs. 2 and 4, and this gear is in position to be engaged by and to mesh with a pinion $e^3$, Figs. 1, 9, and 10, on each of the stems $e'$ of the holders E, the engagement taking place when the holder is brought around by the feed-table D to its proper position with relation to the peeling-knife F. Thus when each holder arrives at this position its pinion $e^3$ will engage with the continuously-rotating gear $o'$, and the holder E will thereby be rotated as long as this engagement lasts, which will be until the peeling operation is complete and the table D moves it on one step.

The means for effecting the rotary movement of knife F are as follows: Upon power-shaft H is a pulley $h^3$, from which a belt $h^4$ extends to a pulley $p$ on a sleeve P, journaled upon one of the pivotal shafts $g'$ of the swinging bracket $f^5$, Figs. 1, 2, and 3. This sleeve also carries a pulley $p'$, from which a belt $p^2$ passes over guide-pulleys $p^3$, carried by the swinging bracket $f^5$, and thence to a pulley $p^4$ on the stem $f$ of the peeling-knife F, Figs. 1, 2, 3, 7, and 8.

The means for effecting the upward swing of bracket $f^5$ in order to carry the rotating peeling-knife over the spherical surface of the fruit, as I have heretofore described, are as follows: On the lower end of the vertical counter-shaft N, before mentioned, is a pinion $n^2$, Figs. 1 and 2, which meshes with a pinion $q$ on a short counter-shaft Q, mounted on platform J, Fig. 5. This shaft carries another pinion $q'$, which meshes with a pinion $r$ on a shaft R, mounted on platform J, Figs. 1 and 5. On one end of shaft R is a cam $r'$, which is adapted to engage with the lower end of a link S, Figs. 1, 2, and 3, the upper end of which is connected with a crank-arm $s$, secured upon one of the pivotal shafts $g'$, which carry the swinging bracket $f^5$. This cam $r'$ is so shaped and timed that it will swing the bracket $f^5$ upwardly to carry the peeling-knife over and in contact with the hemisphere of the fruit, and when the operation of the knife is complete the cam $r'$ will release the bracket to permit it to drop back to its initial position. Some provision must be made to throw the knife at the completion of its operation of peeling out of contact with the fruit and to hold it out of such contact in order to prevent its return in precisely the same path as its advance, which would cause it to travel back over the peeled fruit. To accomplish this, the following means are employed:

Upon the swinging bracket $f^5$ is mounted a rock-shaft T, Fig. 8, one end of which carries a crank-arm $t$, which lies in contact with the base $f^8$ of the knife-carrying sleeve $f'$ at a point above its pivotal journal-pins $f^7$. The other end of this rock-shaft carries a crank-arm $t'$, which is adapted to come in contact with a fixed arm $t^2$, Fig. 6, secured to one of the standards $g$ of platform G. The cam $r'$, which causes the bracket $f^5$ to swing upwardly until the knife F has completed the peeling operation, is so shaped that it forces said bracket upwardly a little farther. This extra movement of the bracket carries the crank-arm $t'$ into contact with the fixed arm $t^2$, which has the effect of pressing the crank-arm $t'$ downwardly, thereby rocking the shaft T. This movement of the shaft causes its other crank-arm $t$ to bear up under the base $f^8$ of the knife-carrying sleeve $f'$, whereby said sleeve and the knife which it carries are thrown upward away from the fruit. It is necessary that the sleeve and knife shall be locked in this position during the descent of the bracket $f^5$, and for this purpose I have a spring-controlled locking-pin $t^3$, Fig. 8, mounted and adapted to slide in a bearing $t^4$ on the bracket $f^5$. This pin is held normally retracted by contact behind the arm $t'$; but when said arm is depressed by contact with the fixed arm $t^2$, as I have already described, the lock-pin $t^3$ is projected by its spring directly over the top of the crank-arm $t'$, thereby holding said arm down, which has the effect of keeping the other crank-arm $t$ against its bearing with the sleeve-base, and thus holding the knife in the position desired during the descent of the bracket $f^5$. In order to release the rock-shaft T from this locking effect when the bracket has returned to its initial position, and thereby permit the knife to return to proper position for its next operation, there is on the lock-pin $t^3$ a cam-disk $t^5$, having a beveled edge. When the bracket reaches its lowermost limit, this cam-disk comes in contact with a fixed lug $t^6$, which bearing upon the inclined edge of the cam forces the lock-pin $t^3$ back from its position over the crank-arm $t'$, thereby freeing the knife, which under the influence of its controlling-spring returns to its operative position.

As the fruit to be peeled is substantially hemispherical, its base or circumference of greatest diameter will revolve at a higher rate of speed than its apex or circumference of less diameter, and it will consequently result that if the speed of rotation of the fruit-holder E be maintained at an equal rate throughout the operation of the knife the time taken in peeling a given surface will gradually increase from the circumference of greater diameter to the apex of the fruit. To prevent this, and thereby save time, I provide for so varying the motion imparted to the holder E as to increase its rate of speed as the operation of peeling progresses. This increase, though it may take place from the beginning, is preferably initiated after a complete cut of the peeling-knife around the base of the peach. Any suitable variable-gear mechanism may be employed to accomplish this increase in the speed of the holder E, and for this purpose I have here indicated in Fig. 5 by the shape of the two gears $m'$ and $n$ a variable-speed transmission to the gear $n$, which will result in an increase in the speed of the fruit-holder E. Though the speed of rotation of the knife F on its own axis remains the same throughout the operation, I gradually increase the speed of its bodily movement in a vertical arc in traveling up over the surface of the fruit to correspond to the increase of the speed of the rotation of the fruit, and for this purpose the cam $r'$ may be so shaped that it will give this increased movement to the bracket $f^5$ to carry the knife accordingly; but I have here shown this increase of speed of the arc movement of the knife as being the result of transmitting the increasing motion of the shaft N, due to the variable gears $m'$ and $n$, back to shaft R and cam $r'$, whereby the movement of said cam is increased to effect an increased speed in the upward swing of the bracket $f^5$.

Figure 9:
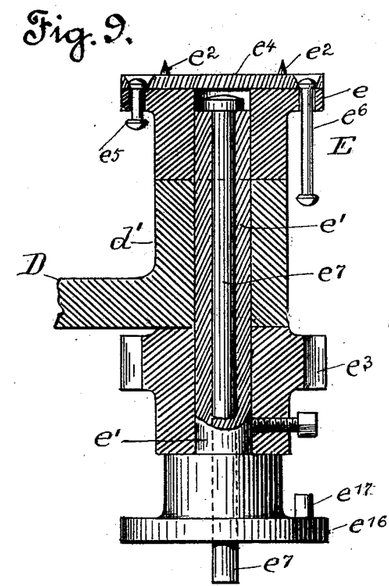
Fig. 9 is an enlarged sectional detail of one of the fruit-holders E.
Figure 10:
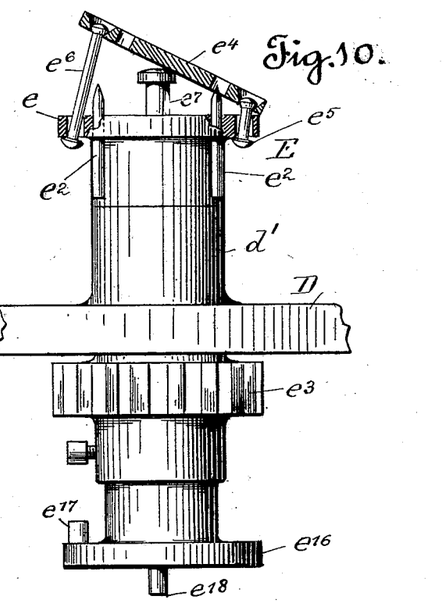
Fig. 10 is an elevation of same, the discharge-plate $e^4$ being in section and shown in tilted position.

After the fruit has been peeled I provide for its discharge from the holder by the following means: On top of the head disk or plate $e$ of the holder is a discharge-plate $e^4$, Figs. 9 and 10, which lies freely on top of the disk $e$ and plays freely over the impaling-pins $e^2$ of said disk. This discharge-plate is connected with the disk $e$ in such a manner that it may be tilted in rising, whereby it will lift the fruit from the impaling-pins, and by its tilting movement will throw the fruit off. Any suitable connection or hinge may be employed for this purpose. The form here shown, as seen in Figs. 9 and 10, consists of a short pin $e^5$ and a long pin $e^6$ diametrically opposite. These pins pass freely through the discharge-plate $e^4$ and the head-disk $e$ and are provided with heads, so that while they permit the separation of the two to allow the former to rise and tilt they still hold them together properly. Passing down through the stem $e'$ of the holder E is a plunger-rod $e^7$, the upper end of which lies below the discharge-plate $e^4$ and the lower end of which projects below the stem. If now this plunger-rod is forced upwardly from below with a quick sudden movement, its upper end coming in contact with said discharge-plate will throw said plate upwardly and cause it to tilt, by reason of its long and short pins, and the fruit will thereby be discharged from the holder. The plunger-rod and the discharge-plate will then return by gravity. To effect this operation of the plunger-rod $e^7$, there is a vertically-movable spring-controlled push-rod $e^8$, Figs. 1 and 2, which is mounted in brackets $e^9$, secured to the fixed platforms G and J. To the lower end of this rod is connected a lever $e^{10}$, Fig. 2, pivoted in the lower end of a post $e^{11}$, depending from the platform G. The rear end of this lever $e^{10}$ is affected by a cam $e^{12}$, carried by a counter-shaft $e^{13}$, supported at one end by a bracket $a$, rising from the base-plate A, and at the other end by bracket $e^{14}$, extending from the platform J. This shaft carries a pinion $e^{15}$, Fig. 5, which meshes with a pinion $r^2$ on the counter-shaft R, heretofore mentioned. The cam $e^{12}$, acting on the other end of lever $e^{10}$, serves to hold the push-rod $e^8$ down against the action of its controlling-spring until by the shape of the cam the lever is momentarily relieved and the spring throws the push-rod $e^8$ upwardly. This is effected when one of the fruit-holders E is in a position to have its fruit discharged, which result is accomplished by the push-rod $e^8$ striking the plunger-rod $e^7$, which then lies directly above it, thereby causing the discharge-plate $e^4$ to tilt, as shown in Fig. 10. As I have here described a discharging mechanism of a tilting character, it is necessary that provision be made to present the holder E in such a position that the tilting of the discharge-plate $e^4$ shall be outwardly in order to throw the fruit outwardly from the feed-table D rather than inwardly. To accomplish this result, there is fixed to the platform G a plate U, Fig. 4, which has upon it on one side a guide $u$, and in its top it is provided with a guide-groove $u'$, having a wide converging entrance. Upon the lower end of the stem $e'$ of the holder E is a disk $e^{16}$, Figs. 9 and 10, which has upon its upper surface a contact-lug $e^{17}$ and has projecting from its lower surface a guide-stud $e^{18}$, Figs. 10 and 12. The guide-stud $e^{18}$ is so placed that if it can pass into the wide entrance of the guide-groove $u'$ the holder E is or will be turned by the stud contacting with the groove-walls to such a position that the discharging-plate $e^4$ will tilt outwardly. The contact-lug $e^{17}$ is in such a position that if the guide-stud $e^{18}$ will enter the groove $u'$ said lug will not come in contact with the guide $u$; but if upon the termination of the peeling process the holder E is left in such a position that the stud $e^{18}$ will not enter the groove $u'$ said contact-lug $e^{17}$ will strike the guide $u$ and will thereby turn the holder E to such a position as to enable the guide-stud $e^{18}$ to enter the groove $u'$.

It may be necessary in practice to provide some means for pressing or holding down upon the top of the fruit to hold it against the pressure of the knife while peeling it. One form of a device of this character I here show.

V is a bracket-arm which is fixed upon the top of the central spindle C, Fig. 2. In this bracket is mounted and adapted to slide vertically a rod $v$, Figs. 1 and 2, the lower end of which carries a pressure or holding device. This is here shown as a pair of pressure-rollers $v'$ of any suitable character, Figs. 2 and 3. They should be of some cushioned material to avoid injuring the fruit. They press down upon the top of the fruit by gravity, but are removed when the knife approaches and are held away to avoid running on a peeled surface and also to permit a succeeding fruit to come under them. To accomplish this, there is a vertically-movable rod $v^2$, Figs. 1 and 2, the lower end of which rests upon and is operated by a cam $v^3$ on the counter-shaft $e^{13}$, Fig. 2. To the top of this rod is secured an arm $v^4$, Fig. 11, the extremity of which plays freely upon the rod $v$, which carries the pressure-rollers $v'$, Fig. 2. At the proper time the arm $v^4$ being lifted comes up under a collar $v^5$ on the rod $v$, and thereby lifts said rod, thus carrying the pressure-rollers out of contact with the fruit. This, as before stated, is at the time when the peeling-knife is coming to that portion of the fruit which the pressure-rollers rested upon. The arm $v^4$ continues to hold the pressure-rollers up until a fresh fruit has been fed to place, whereupon the pressure-rollers descend by gravity and rest upon the fruit. At the time when the pressure-rollers are removed from the fruit the force of the peeling-knife has been transferred from a side pressure to top pressure, so that the pressure-rollers are thus no longer needed.

In order to make the bracket $f^5$, which carries the peeling-knife, operate as easily as possible, I attach an adjustable weight W, Fig. 3, in order to counterbalance it.

A general description of the operation is as follows: The halved fruit, which I have here represented by X, is placed by the operator successively upon the impaling-pins $e^2$ of the holders E, with the hemispherical side up, as in Fig. 13. When by the feed motion of table D one of the holders reaches the peeling-knife, the fruit in said holder bears, as shown in Figs. 13 and 14, against the gage $f^2$ of the knife, said gage pressing against the fruit with the yielding pressure due to the controlling-spring $f^9$. This gage has been so set with respect to the paths described by the axially-rotating knife and the rotating fruit as to define the depth of the cut of the knife in peeling, as seen in Fig. 14. The table D is now at rest, but the fruit is being rotated in one direction by its holder E, while the knife is rapidly rotating on its axis in the opposite direction, as indicated in Fig. 14, and thereby the base of the fruit around its entire circumference is peeled. At this time the bracket $f^5$ begins to rise and to carry knife and gage bodily through a vertical arc in contact with the hemisphere of the fruit, as is shown by the dotted lines in Fig. 13. As the knife moves upwardly and increases in the speed of its upward movement the speed of rotation of the fruit increases also, whereby time is saved, as I have heretofore described. When the knife reaches the upper portion of the fruit, the pressure-rollers $v'$, which have been bearing on top of the fruit, rise up out of the way and remain away from the peeled surface and the knife completes the peeling operation. The bracket $f^5$ continuing to move upwardly causes the knife to be thrown upwardly away from the fruit and locked in that position. Then the bracket $f^5$ being relieved descends to its initial position, whereupon the knife is unlocked and returns to its operative place. A second movement of the table D now taking place a fresh fruit is brought to the knife, the pressure-rollers descend upon it, and the operation is repeated. In due time as each holder E reaches the push-rod $e^8$ the discharge-plate $e^4$ is tilted and the peeled fruit is thrown outwardly and may be receiving in any suitable receptacle.

Having thus described my invention, what I claim as new, and desire to secure by Letters Patent, is—

1. In a fruit-peeling machine, the combination of a fruit-holder, a peeling-knife, having its cutting edge presented for rolling contact with the fruit in said holder and means for rotating the fruit-holder and knife in opposite directions of peripheral travel at the beginning of cutting contact.

2. In a fruit-peeling machine, the combination of a fruit-holder, a peeling-knife having a straight cutting edge parallel with the axis of rotation of the knife and means for rotating the fruit-holder and knife in opposite directions of peripheral travel at the beginning of cutting contact.

3. In a fruit-peeling machine, the combination of a rotating fruit-holder, a rotating knife having a straight cutting edge parallel with the axis of rotation and intersecting tangentially the fruit in the holder, and a gage parallel with said cutting edge and set relatively thereto to define the depth of the cut.

4. In a fruit-peeling machine, the combination of a rotating fruit-holder, a rotating knife having a straight cutting edge parallel with the axis of rotation and intersecting tangentially the fruit in the holder, and an adjustable gage parallel with said cutting edge and set relatively thereto to define and vary the depth of the cut.

5. In a fruit-peeling machine, the combination of a peeling-knife having a cutting-blade, means for rotating said knife on an axis parallel with its blade and a gage parallel with said blade and set outside the path of rotation thereof, and back of its cutting plane.

6. In a fruit-peeling machine, the combination of a peeling-knife having a cutting-blade, means for rotating said knife on an axis parallel with its blade and a gage parallel with said blade and set outside the path of rotation thereof and back of its cutting plane, said gage being circumferentially adjustable to change its position back of said cutting plane and to vary the depth of the cut of said blade.

7. In a fruit-peeling machine, the combination of a rotating peeling-knife, a carrying-sleeve in which said knife is journaled and a gage adapted to define the depth of the knife cut, said gage being carried by and circumferentially adjustable upon said sleeve to vary its position relatively to the cutting plane of the knife.

8. In a fruit-peeling machine, the combination of the peeling-knife having a stem, the carrying-sleeve in which said stem is rotatably fitted, the gage for defining the depth of the knife cut, and the base-clamp of said gage adjustably fitted circumferentially on the sleeve.

9. In a fruit-peeling machine, the combination of the peeling-knife having the oppositely-located separated blades, provided with a common stem, a carrying-sleeve in which said stem is rotatably journaled, and the gage beside the knife-blades and lying outside their path of rotation said gage being supported by the sleeve, and adapted to be circumferentially adjusted thereon to vary its position relatively to the cutting plane of the knife-blades.

10. In a fruit-peeling machine, the combination of a rotating fruit-holder, and a peeling-knife, traveling in a plane in cutting contact with the fruit in the holder and varying during said travel its angle to the axis of rotation of said fruit-holder.

11. In a fruit-peeling machine, the combination of a rotating fruit-holder, and a peeling-knife rotating on an axis traveling in a plane to carry said knife in cutting contact with the fruit in the holder, said axis varying, during its travel, its angle to the axis of rotation of the fruit-holder.

12. In a fruit-peeling machine, the combination of a fruit-holder, a peeling-knife mounted on an axis traveling in a plane to carry said knife in cutting contact with the fruit in the holder, said axis varying, during its travel, its angle to the axis of rotation of the fruit-holder, and means for rotating the fruit-holder and knife in opposite directions of peripheral travel at the beginning of cutting contact.

13. In a fruit-peeling machine, the combination of a rotating fruit-holder, a rotating peeling-knife having a straight cutting edge parallel with the axis of the knife and intersecting tangentially the fruit in the holder, and means for effecting the travel of said knife in cutting contact with the fruit, in a plane with its axis varying its angle to the axis of rotation of the fruit-holder.

14. In a fruit-peeling machine, the combination of a fruit-holder, a peeling-knife having a straight cutting edge parallel with the axis of the knife and intersecting tangentially the fruit in the holder, means for rotating the fruit-holder and knife in opposite directions of peripheral travel at the beginning of cutting contact, and means for effecting the travel of said knife in cutting contact with the fruit, in a plane with its axis varying its angle to the axis of rotation of the fruit-holder.

15. In a fruit-peeling machine, the combination of a rotating fruit-holder, a rotating peeling-knife having a straight cutting edge parallel with the axis of the knife and intersecting tangentially the fruit in the holder, a gage parallel with said cutting edge and set relatively thereto to define the depth of the cut, and means for effecting the travel of said knife and gage in contact with the fruit, in a plane with the axis of the knife varying its angle to the axis of rotation of the fruit-holder.

16. In a fruit-peeling machine, the combination of a rotating fruit-holder, a peeling-knife and a swinging bracket adapted to carry said knife in a plane in cutting contact with the fruit in the holder and to vary the angle of the knife to the axis of rotation of said fruit-holder.

17. In a fruit-peeling machine, the combination of a rotating fruit-holder, a peeling-knife, a swinging bracket adapted to carry said knife in a plane in cutting contact with the fruit in the holder and to vary the angle of the knife to the axis of rotation of said fruit-holder, and to return said knife to its initial position, and means for throwing and holding the knife out of contact with the fruit during the return of the swinging bracket.

18. In a fruit-peeling machine, the combination of a rotating fruit-holder, a rotating peeling-knife, a pivotally-mounted spring-controlled carrying-sleeve in which the knife is rotatably mounted, and a swinging bracket carrying said sleeve and adapted to carry the knife in a plane in cutting contact with the fruit in the holder, with the axis of the knife varying its angle to the axis of rotation of the fruit-holder.

19. In a fruit-peeling machine, the combination of a rotating fruit-holder, a rotating peeling-knife having a straight cutting edge parallel with the axis of the knife and intersecting tangentially the fruit in the holder, a pivotally-mounted spring-controlled carrying-sleeve in which said knife is rotatably mounted, a gage parallel with the cutting edge of the knife and adjustably carried by the sleeve for defining and varying the depth of the knife cut, and a swinging bracket carrying said sleeve and adapted to carry the knife in a plane in cutting contact with the fruit in the holder, with the axis of the knife varying its angle to the axis of rotation of the fruit-holder.

20. In a fruit-peeling machine, the combination of means for rotating the fruit, a rotating peeling-knife, a pivotally-mounted spring-controlled carrying-sleeve in which said knife is rotatably mounted, a gage adjustably carried by the sleeve for defining and varying the depth of the knife cut, a swinging bracket carrying said sleeve and adapted by its movement to carry the rotating knife and its gage in a plane in contact with the fruit and with the axis of the knife varying its angle to the axis of rotation of the fruit, and to return them to initial position and means acting on the sleeve for throwing and holding the knife and gage out of contact with the fruit during the return of the swinging bracket.

21. In a fruit-peeling machine, the combination of means for rotating the fruit, a peeling-knife, means for carrying said knife through a vertical arc over and in contact with the convex surface of the rotating fruit and a means for increasing the rate of speed of the fruit's rotation while the knife is traveling up on the convex surface of said fruit.

22. In a fruit-peeling machine, the combination of means for rotating the fruit, a peeling-knife, means for carrying said knife through a vertical arc over and in contact with the convex surface of the rotating fruit, a means for increasing the rate of speed of the fruit's rotation while the knife is traveling up on the convex surface of said fruit and means for correspondingly increasing the speed of the travel of the knife up on said convex surface.

23. In a fruit-peeling machine, the combination of means for rotating the fruit, a peeling-knife, means for rotating said knife on its axis, means for carrying said rotating knife through a vertical arc over and in contact with the convex surface of the rotating fruit and a means for increasing the rate of speed of the fruit's rotation while the knife is traveling up on the convex surface of said fruit.

24. In a fruit-peeling machine, the combination of means for rotating the fruit, a peeling-knife, means for rotating said knife on its axis, means for carrying said rotating knife through a vertical arc over and in contact with the convex surface of the rotating fruit, a means for increasing the rate of speed of the fruit's rotation while the knife is traveling up on the convex surface of said fruit and means for correspondingly increasing the speed of the travel of the knife up on said convex surface.

25. In a fruit-peeling machine, the combination of a feed-table, an annular series of fruit-holders carried by said table, means for imparting to the table a periodical movement on its axis to carry each of its fruit-holders successively to position to have its fruit peeled, means for imparting to each fruit-holder an axially-rotary movement when it arrives at and while remaining in said position, a peeling-knife adapted to operate upon the fruit presented by said rotating fruit-holder, and means for carrying said knife in a plane in contact with the fruit, and to vary the angle of the knife to the axis of rotation of the fruit.

26. In a fruit-peeling machine, the combination of a feed-table, an annular series of fruit-holders carried by said table, means for imparting to the table a periodical movement on its axis to carry each of its fruit-holders successively to position to have its fruit peeled, means for imparting to each fruit-holder an axially rotary movement when it arrives at and while remaining in said position, a peeling-knife adapted to operate upon the fruit presented by said rotating fruit-holder, means for axially rotating said knife, and means for carrying said rotating knife in a plane in contact with the fruit, and to vary the angle of the knife to the axis of rotation of the fruit.

27. In a fruit-peeling machine, the combination of a holder for the fruit consisting of a flat-head disk or plate provided with retaining devices for engaging the halved fruit which lies thereon flat side down and convex side up, means for rotating said head disk or plate on its axis, an axially-rotating peeling-knife, and means for carrying said knife in a plane in contact with the hemisphere of said fruit from its base to its apex with the axis of said knife varying its angle to the axis of rotation of the fruit.

28. In a fruit-peeling machine, the combination of a holder having a head disk or plate with suitable retaining devices engaging the fruit, a tiltable discharge-plate lying on the head disk or plate and upon which the fruit rests and by the tilting of which it is discharged from the holder, a hinge connection between one side of the head-plate and discharge-plate, and a limiting connection between the opposite sides.

29. In a fruit-peeling machine, the combination of a holder having a head disk or plate with suitable retaining devices engaging the fruit, a tiltable discharge-plate lying on the head disk or plate and upon which the fruit rests and by the tilting of which it is discharged from the holder, a hinge connection between the head-plate and discharge-plate at one side and a limiting connection at the opposite side, a vertically-movable plunger-rod adapted to rise up under and to tilt said plate, and means for operating said rod.

30. In a fruit-peeling machine, the combination of a periodically-rotating feed-table, a series of fruit-holders carried thereby, each consisting of a head disk or plate with fruit-retaining devices and a rotatable stem, a tiltable discharge-plate on each head-plate, means for tilting said discharge-plate and means for turning each holder to such a position that its discharge-plate will tilt outwardly from the table.

31. In a fruit-peeling machine, the combination of a periodically-rotating feed-table, a series of fruit-holders carried thereby, each consisting of a head disk or plate with fruit-retaining devices and a rotatable stem, a tiltable discharge-plate on each head-plate, means for tilting said discharge-plate and means for turning each holder to such a position that its discharge-plate will tilt outwardly from the table, said means comprising contacts on the holder-stem and fixed guides with which said contacts engage.

32. In a fruit-peeling machine, the combination of a periodically-rotating feed-table, a series of fruit-holders carried thereby each consisting of a head disk or plate with fruit-retaining devices and a rotatable stem, a tiltable discharge-plate on which the fruit rests, means for rotating said holders, a rotating peeling-knife with means for carrying it in a vertical arc up upon the convex surface of the rotating fruit, whereby the fruit is peeled, and means for tilting the discharge-plates of the holders to discharge the peeled fruit.

33. In a fruit-peeling machine, the combination of a periodically-rotating feed-table, a series of fruit-holders carried thereby each consisting of a head disk or plate with fruit-retaining devices and a rotatable stem, a tiltable discharge-plate on which the fruit rests, means for rotating said holders, a rotating peeling-knife with means for carrying it in a vertical arc up upon the convex surface of the rotating fruit, whereby the fruit is peeled, means for tilting the discharge-plates of the holders to discharge the peeled fruit, and means for turning the holders to a position to cause the discharge-plates to tilt outwardly from the table.

34. In a fruit-peeling machine, the combination of a rotating fruit-holder, a rotating peeling-knife traveling in a plane in cutting contact with the fruit in the holder and varying the angle of its axis to the axis of rotation of said fruit-holder, and a holding device bearing on top of the fruit to retain it on the holder against the pressure of the peeling-knife.

35. In a fruit-peeling machine, the combination of a rotating fruit-holder, a rotating peeling-knife traveling in a plane in cutting contact with the fruit in the holder and varying the angle of its axis to the axis of rotation of said fruit-holder, a holding device bearing on top of the fruit to retain it on the holder against the pressure of the peeling-knife and means for lifting said holding device from the fruit.

36. In a fruit-peeling machine, the combination of the periodically-rotating feed-table, the rotatable fruit-holders carried thereby, the rotating peeling-knife having means for carrying it up on the convex surface of the fruit, a holding device bearing on top of the fruit to hold it against the pressure of the knife, means for lifting the holding device from the fruit, and means for holding said device elevated to receive under it a fresh fruit fed to position by the table and for effecting its descent thereupon.

37. In a fruit-peeling machine and in combination with a holder for the fruit, and a peeling-knife, a pressure-roller bearing down upon the top of the fruit to retain it on the holder while the knife is operating to peel it.

In witness whereof I have hereunto set my hand.

L. F. GRAHAM.

Witnesses:
WALTER F. VANE,
D. B. RICHARDS.